UNITED STATES PATENT OFFICE.

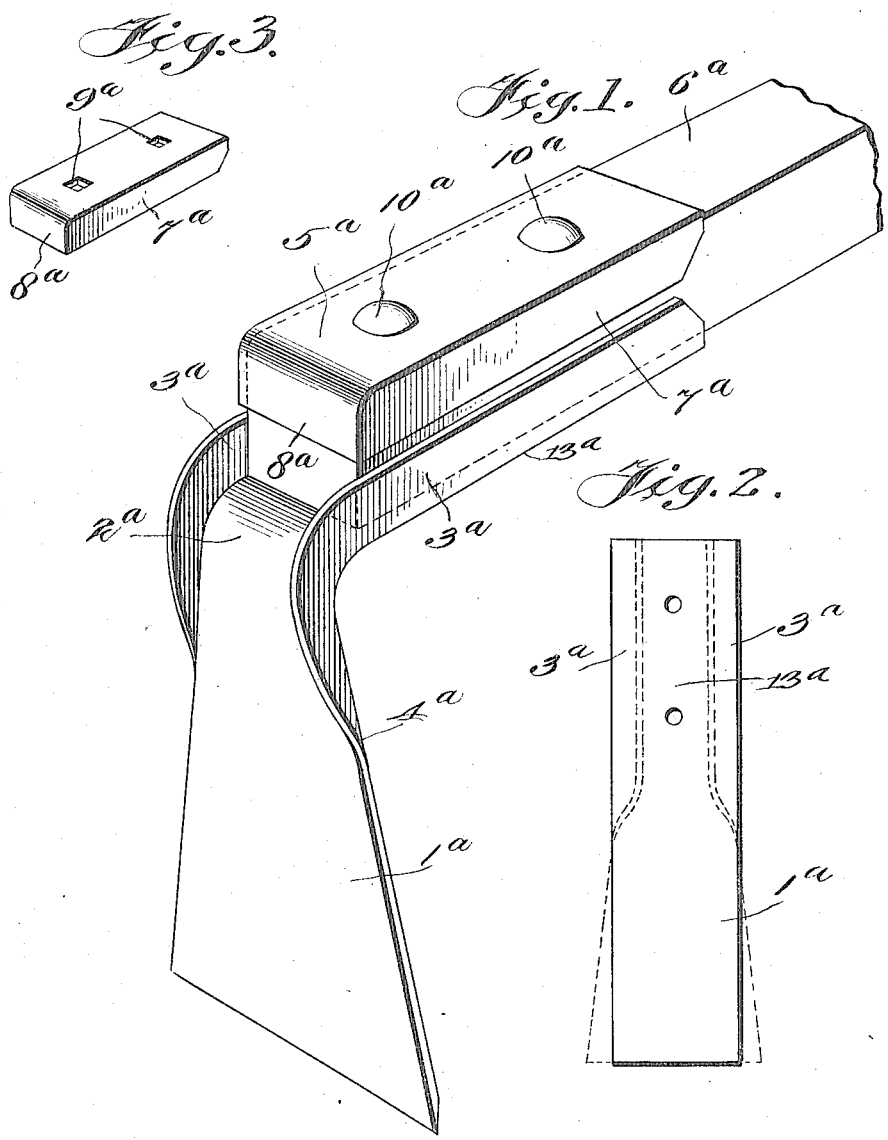

WELFORD R. CLORE, OF BRIGHTWOOD, VIRGINIA.

HOE.

1,196,663. Specification of Letters Patent. Patented Aug. 29, 1916.

Application filed June 17, 1914. Serial No. 845,643.

*To all whom it may concern:*

Be it known that I, WELFORD R. CLORE, a citizen of the United States, residing at Brightwood, in the county of Madison and State of Virginia, have invented certain new and useful Improvements in Hoes, of which the following is a specification.

This invention relates to hoes, and one of the principal objects of the invention is to provide a hoe and an integral shank all stamped up from a single piece of sheet metal and provided with side flanges to fit at the opposite side of a squared handle, and secured thereto by bolts extending through the shank and handle.

The above and other objects may be attained by means of the construction illustrated in the accompanying drawing, in which, Figure 1 is a perspective view of a single hoe blade, and a clod beater connected to the squared lower portion of the handle, in accordance with this invention, Fig. 2 is a top plan view of a blank from which the hoe blade is formed, showing in dotted lines the development of the side flanges and the blade, and Fig. 3 is a perspective view of the clod beater, made on a smaller scale and showing the squared opening for the bolts.

Referring to the drawing, it will be seen that the hoe blade $1^a$, the neck $2^a$ and the shank $13^a$ are formed of a single piece of sheet metal, and that the hoe blade is not reduced in width at the point where the side flanges join the blade, or at the point $4^a$. A clod beater $5^a$ is adapted to be connected at the end of the handle $6^a$ when the rake is removed or when a single hoe is used upon the handle. The clod beater is provided with side flanges $7^a$ and the front end of the clod beater is turned down as at $8^a$ to cover the front of hoe member $6^a$. The holes $9^a$ for the bolts are squared and the bolts $10^a$ extend through the square holes and through squared holes in the handle $6^a$, so that the nuts on the ends of the bolts will not rotate the bolts when taking them off.

In accordance with my invention, it will be possible for a merchant to carry a number of the handles having squared ends and the various tools that could be connected to the ends of the handles comprising single hoe blades having the side flanges and the clod beater having the side flanges and end portions which serves to prevent the splitting of the handle and also serves as a plate to prevent the turning of the bolt, and by carrying the shank portion for the rake and other parts, all characters of hoes and rakes may be provided for and the various tools may be interchangeably connected to the squared end of the handle.

From the foregoing it will be obvious that the hoe may be formed of a single piece of rectangular sheet metal of the required gage stamped into form to provide the side flanges $3^a$, and the device thus made forms a strong durable and efficient structure for the purposes designed.

Various changes may be made in the details of construction without departing from the spirit and scope of the invention as defined in the claim.

What is claimed is:—

A hoe comprising an elongated straight shank; a substantially triangular shaped blade arranged at an angle to the shank; a curved neck connecting the upper end of the blade to one end of the shank; flanges formed on the sides of the shank, neck and upper portion of the blade; said shank, neck flanges and blade being stamped from a single piece of rectangular sheet metal.

In testimony whereof I affix my signature in presence of two witnesses.

WELFORD R. CLORE.

Witnesses:
B. B. WEAVER,
J. C. CRIGLER, Jr.

Copies of this patent may be obtained for five cents each, by addressing the "Commissioner of Patents, Washington, D. C."